US009936555B2

United States Patent
Aliakseyeu et al.

(10) Patent No.: US 9,936,555 B2
(45) Date of Patent: Apr. 3, 2018

(54) LIGHTING CONFIGURATION APPARATUS AND METHODS UTILIZING DISTANCE SENSORS

(71) Applicant: PHILIPS LIGHTING HOLDING B.V., Eindhoven (NL)

(72) Inventors: Dzmitry Viktorovich Aliakseyeu, Eindhoven (NL); Dirk Valentinus René Engelen, Heusden-Zolder (BE); Tatiana Aleksandrovna Lashina, Eindhoven (NL); Bartel Marinus Van De Sluis, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/541,254

(22) Filed: Nov. 14, 2014

(65) Prior Publication Data

US 2015/0137686 A1 May 21, 2015

Related U.S. Application Data

(63) Continuation of application No. 14/377,182, filed as application No. PCT/IB2013/051119 on Feb. 11, 2013.

(60) Provisional application No. 61/599,478, filed on Feb. 16, 2012.

(51) Int. Cl.
*H05B 37/02* (2006.01)
*H05B 41/36* (2006.01)
*H05B 33/08* (2006.01)

(52) U.S. Cl.
CPC ..... *H05B 33/0854* (2013.01); *H05B 33/0872* (2013.01); *H05B 37/0218* (2013.01); *H05B 37/0227* (2013.01)

(58) Field of Classification Search
CPC .................. H05B 37/02; H05B 41/36
USPC ......... 315/153, 307, 292, 297; 340/565, 541
See application file for complete search history.

(56) References Cited

U.S. PATENT DOCUMENTS

| | | | |
|---|---|---|---|
| 7,796,034 B2* | 9/2010 | Laski et al. | 340/565 |
| 2008/0265799 A1* | 10/2008 | Sibert | 315/292 |
| 2010/0301767 A1 | 12/2010 | Van De Sluis | |
| 2011/0031897 A1 | 2/2011 | Henig | |
| 2011/0057581 A1 | 3/2011 | Ashar | |
| 2012/0019168 A1* | 1/2012 | Noda et al. | 315/307 |

(Continued)

FOREIGN PATENT DOCUMENTS

| | | | |
|---|---|---|---|
| AT | 509035 A1 * | 5/2011 | |
| CA | 2671680 A1 | 1/2011 | |
| EP | 1408276 A2 * | 4/2004 | |

(Continued)

OTHER PUBLICATIONS

Tachikawa Masaaki, English Machine Translation of JP2010049938A, Mar. 4, 2010, pp. 1-10.*

(Continued)

*Primary Examiner* — Daniel D Chang
(74) *Attorney, Agent, or Firm* — Meenakshy Chakravorty (57) ABSTRACT

Disclosed are methods and apparatus for lighting configuration, contemplating analysis of a plurality of distance values from a plurality of distance sensors to set one or more light output characteristics of a plurality of LEDs. The light output characteristics of the LEDs are set as a function of the distance values from the distance sensors.

9 Claims, 4 Drawing Sheets

(56) References Cited

U.S. PATENT DOCUMENTS

| | | |
|---|---|---|
| 2012/0229033 A1 | 9/2012 | Vaclavik et al. |
| 2015/0061509 A1 | 3/2015 | Karlicek et al. |

FOREIGN PATENT DOCUMENTS

| | | | |
|---|---|---|---|
| JP | H08195284 | * | 7/1996 |
| JP | H08195284 A | | 7/1996 |
| JP | 2010049938 | | 3/2010 |
| JP | 2010049938 A | * | 3/2010 |
| JP | 2012028015 A | | 2/2012 |
| WO | WO2009133505 A1 | | 11/2009 |
| WO | WO2010131212 A1 | | 11/2010 |
| WO | WO2011057313 A1 | | 3/2011 |
| WO | 2011098945 A1 | | 8/2011 |
| WO | WO2012085738 A1 | | 6/2012 |

OTHER PUBLICATIONS

Iwai Michiko et al. "Lighting System", Jul. 30, 1996, English machine translation of JP8195284A, 12 pages.*

* cited by examiner

LIGHTING CONFIGURATION APPARATUS AND METHODS UTILIZING DISTANCE SENSORS

TECHNICAL FIELD

The present invention is directed generally to lighting configuration. More particularly, various inventive methods and apparatus disclosed herein relate to lighting configuration utilizing a plurality of distance sensors.

BACKGROUND

Digital lighting technologies, i.e. illumination based on semiconductor light sources, such as light-emitting diodes (LEDs), offer a viable alternative to traditional fluorescent, HID, and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications. Some of the fixtures embodying these sources feature a lighting module, including one or more LEDs capable of producing different colors, e.g. red, green, and blue, as well as a processor for independently controlling the output of the LEDs in order to generate a variety of colors and color-changing lighting effects.

Lighting fixtures embodying LEDs may be desirable in various settings such as, for example, commercial settings. Currently, most sensors that are utilized in commercial settings in combination with LED lighting fixtures are installed to capture relevant data on large areas. For example, an office may have one presence sensor in a space that will sense movements anywhere in the space and cause all lighting fixtures in the space to be illuminated in response to detected movement. Also, for example, an office may have one ambient light sensor in a space that will sense an ambient light level and cause a light output intensity of all lighting fixtures in the space to be adjusted based on the ambient light level. Such sensors may enable limited control of lighting fixtures, but do not provide for initial configuration, fine tuning, and/or adaptation of individual lighting fixtures and/or individual light sources.

Initial configuration of lighting fixtures in a commercial environment is often accomplished by calculating the number of luminaires and spacing to height ratio based on the target working surface illuminance and uniformity criteria. Such initial configuration is often time consuming and/or not adapted to particular features of the commercial space. Fine tuning of the initial configuration is likewise often time consuming and/or not adequately adapted to particular features of the commercial space. Also, such initial configuration is not easily adaptable to changes in the layout and/or usage of the office space.

Thus, there is a need in the art to provide lighting configuration apparatus and methods that utilize distance sensors and that optionally overcome one or more drawbacks of certain lighting configuration technologies.

SUMMARY

The present disclosure is directed to inventive methods and apparatus for lighting configuration. For example, lighting configuration methods and apparatus described herein may analyze a plurality of readings from a plurality of distance sensors to set one or more light output characteristics of a plurality of LEDs. The light output characteristics of the LEDs are set as a function of the readings from the distance sensors.

Generally, in one aspect, a method of calibrating light output of a plurality of LEDs is provided and includes the steps of: determining a first distance value at a first distance sensor and determining a second distance value at a second distance sensor; correlating the first distance value with at least a first LED of a plurality of LEDs; correlating the second distance value with at least a second LED of the plurality of LEDs; determining at least one ambient light level proximate the first LED and the second LED; setting a first light output of the first LED as a function of the first distance value and the ambient light level; and setting a second light output of the second LED as a function of the second distance value and the ambient light level.

In some embodiments, the method further includes the step of monitoring the first distance sensor over a period of time for a plurality of substantial deviations from the first distance value to determine whether the first distance sensor is above at least one of a pathway and a high activity area. In some versions of those embodiments the first light output is set as a function of whether the first distance sensor is above the at least one of the pathway and the high activity area. In some versions of those embodiments the first light output is of a greater intensity if it is determined the first distance sensor is directed at the at least one of the pathway and the high activity area than it is if it is determined the first distance sensor is not directed at the at least one of the pathway and the high activity area.

In some embodiments, the method further includes the step of monitoring the first distance sensor over a period of time for a plurality of substantial deviations from the first distance value and the step of setting the first light output is a function of at least one of frequency of the substantial deviations and distance value of the substantial deviations.

In some embodiments, the first light output is set as a function of the difference between the first distance value and the second distance value. In some versions of those embodiments the first light output is of a lesser intensity if it is determined the first distance value is significantly less than the second distance value than it is if it is determined the first distance value is significantly greater than the second distance value. In some versions of those embodiments the first distance value is correlated only with the first LED.

Generally, in another aspect, a method of calibrating light output of a plurality of LEDs is provided and includes the steps of: determining a maximum distance for each of a plurality of distance sensors, each of the distance sensors associated with at least one LED of a plurality of LEDs; grouping each of a plurality of the maximum distance into one of at least a first distribution and a second distribution, the first distribution containing distance values larger than the second distribution; setting light output characteristics of a first LED group of the LEDs in accordance with floor lighting characteristics, the first LED group associated with the distance sensors having the maximum distance in the first distribution; and setting light output characteristics of a second LED group of the LEDs in accordance with workplace lighting characteristics, the second LED group associated with the distance sensors having the maximum distance in the second distribution.

In some embodiments, the method further includes the step of grouping each of a plurality of the maximum distances into a third distribution, wherein the second distribution contains distance values larger than the third distribution. In some embodiments the method further includes the step of setting light output characteristics of a third LED group of the LEDs in accordance with tall structure characteristics, the third LED group associated with the distance sensors having the maximum distance in the third distribution. In some versions of those embodiments the method further includes the step of determining at least one ambient light level, wherein the light output characteristics of each of the first LED group, the second LED group, and the third LED group is dependent on the ambient light level. In some versions of those embodiments the light output characteristics of the first LED group include a higher light output intensity than the light output characteristics of the third LED group. In some versions of those embodiments the method further includes the step of increasing light output intensity of at least one of the LEDs of the first LED group (relative to other the LEDs of the first LED group) that geographically neighbors the distance sensors having the maximum distance in the third distribution.

In some embodiments, the light output characteristics of the second LED group include a higher light output intensity than the light output characteristics of the first LED group.

In some embodiments, the method further includes the step of monitoring the distance sensors having the maximum distance in the first distribution over a period of time for a plurality of substantial distances deviating from the first distribution to determine whether any of the distance sensors having the maximum distance in the first distribution is directed at a pathway. In some versions of those embodiments the light output characteristics of each LED of the first LED group is set as a function of whether each the LED is associated with one of the distance sensors that is determined to be directed at a pathway. In some versions of those embodiments the light output characteristics of each LED of the first LED group that is associated with one of the distance sensors that is determined to be directed at a pathway is of a greater intensity than the light output characteristics of each LED of the first LED group that is associated with one of the distance sensors that is not determined to be directed at a pathway.

In some embodiments, the method further includes the step of monitoring the distance sensors having the maximum distance in the first distribution over a period of time for a plurality of distances deviating from the first distribution to determine whether any of the distance sensors having the maximum distance in the first distribution is directed at a high activity area.

In some embodiments, the method further includes the step of monitoring the distance sensors having the maximum distance in the second distribution over a period of time for a plurality of distances deviating from the second distribution to determine whether any of the distance sensors having the maximum distance in the second distribution is directed at a high activity area. In some versions of those embodiments the light output characteristics of each LED of the second LED group is set as a function of whether each the LED closely neighbors the high activity area.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "addressable" is used herein to refer to a device (e.g., a light source in general, a lighting unit or fixture, a controller or processor associated with one or more light sources or lighting units, other non-lighting related devices, etc.) that is configured to receive information (e.g., data) intended for multiple devices, including itself, and to selectively respond to particular information intended for it. The term "addressable" often is used in connection with a networked environment (or a "network," discussed further below), in which multiple devices are coupled together via some communications medium or media.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Currently, most sensors that are utilized in commercial settings in combination with LED lighting fixtures are installed to capture relevant data on large areas. Such sensors may enable limited control of lighting fixtures, but do not provide for initial configuration, fine tuning, and/or adaptation of individual lighting fixtures and/or individual light sources. Initial configuration of lighting fixtures in a commercial environment is often accomplished by calculating the number of luminaires and spacing to height ratio based on the target working surface illuminance and uniformity criteria. Such initial configuration is often time consuming and/or not adapted to particular features of the commercial space. Moreover, fine tuning, and/or adaptation to changes in the layout and/or usage of the office space is likewise often time consuming and/or not adequately adapted to particular features of the commercial space. Thus, the Applicants have recognized a need to provide lighting configuration apparatus and methods that utilize distance sensors and that optionally overcome one or more drawbacks of certain conventional lighting configuration technologies.

More generally, Applicants have recognized and appreciated that it would be beneficial to provide lighting configuration apparatus and methods that utilize distance sensors to determine light output characteristics of a plurality of lighting fixtures.

In view of the foregoing, various embodiments and implementations of the present invention are directed to lighting configuration.

In the following detailed description, for purposes of explanation and not limitation, representative embodiments disclosing specific details are set forth in order to provide a thorough understanding of the claimed invention. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatus and methods may be omitted so as to not obscure the description of the representative embodiments. Such methods and apparatus are clearly within the scope of the claimed invention. For example, various embodiments of the approach disclosed herein are particularly suited for a LED-based lighting network installed in an interior commercial environment. Accordingly, for illustrative purposes, the claimed invention is discussed in conjunction with such an environment. However, other configurations and applications of this approach are contemplated without deviating from the scope or spirit of the claimed invention.

Figure 1:
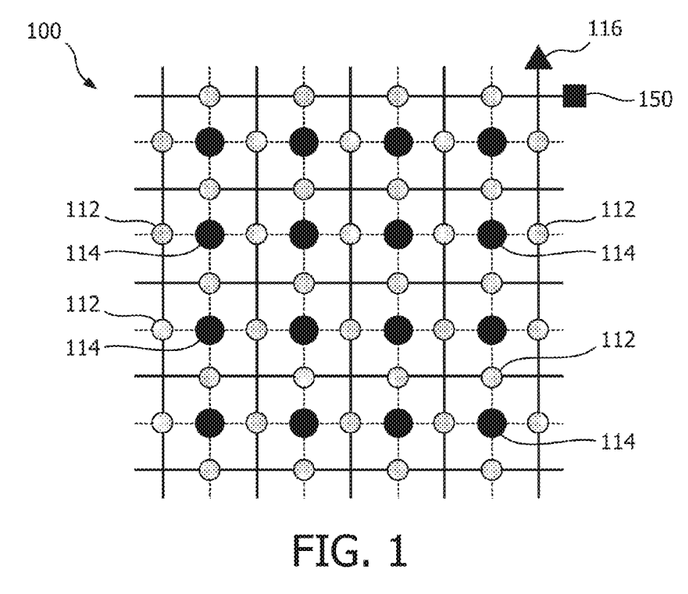
FIG. 1 illustrates a view of a first embodiment of a lighting network having a plurality of LEDs and a plurality of distance sensors.

Referring to FIG. 1, a first embodiment of a LED-based lighting network 100 having a plurality of LEDs 112 and a plurality of distance sensors 114 is illustrated. In some embodiments the distance sensors 114 may include one or more infrared sensors and/or ultrasonic based sensors. The LEDs 112 and distance sensors 114 are in communication with are least one controller 150. The LEDs 112 and distance sensors 114 may be in communication with the controller 150 via one or more wired or wireless communication mediums. As described herein, the controller 150 analyzes values from the distance sensors 114 and sets light output characteristics of one or more of the LEDs 112 as a function of those values. In some embodiments an ambient light sensor 116 may also be provided in communication with the controller 150 and the controller 150 may additionally set light output characteristics of the LEDs 112 as a function of one or more ambient light readings provided by the ambient light sensor 116.

Each of the LEDs 112 is directly or indirectly associated with one or more of the distance sensors 114. For example, in some embodiments one or more of the LEDs 112 may each be associated with a single of one or more of the distance sensors 114 that is closest in distance to such LED 112. Also, for example, in some embodiments one or more of the LEDs 112 may each be associated with the two closest of the distance sensors 114 that are closest in distance to such LED 112. Also, for example, in some embodiments the location of one of more of the LEDs 112 may be known and the location of one or more of the distance sensors 114 may also be known. For instance, in some versions of those embodiments a coordinate system may be utilized to map the relative locations of the LEDs 112 and the distance sensors 114 to one another.

In the illustrated embodiment, there is a higher density of LEDs 112 than distance sensors 114, with sixteen distance sensors 114 and forty LEDs 112 provided in a grid like arrangement. In other embodiments a higher and/or lower ratio of LEDs 112 to distance sensors 114 may be provided. In some versions of the embodiment of FIG. 1 one or more of the distance sensors 114 may have a sensing area that is larger than the light output area of one or more of the LEDs 112. That is, the area along which a single of the distance sensors 114 takes one or more distance readings at a particular distance may be larger than the area that is illuminated by a single of the LEDs 112 at that particular distance. In some embodiments the LEDs 112 and distance sensors 114 are installed on a ceiling of a commercial environment. For example, in some embodiments the LEDs 112 and/or distance sensors 114 may be integrated in ceiling tiles. Also, for example, in some embodiments LEDs 112 and/or distance sensors 114 may be integrated in a sheet like lighting fixture that is installable on a ceiling.

Figure 2A:
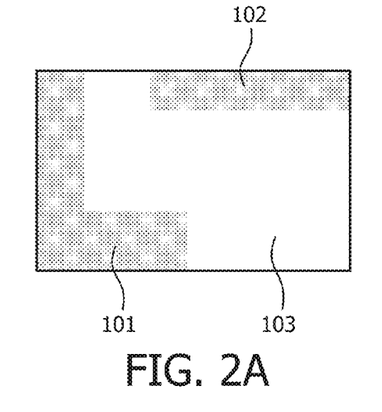
FIG. 2A illustrates a top plan view of a layout of a room.

FIG. 2A illustrates a top plan view of a layout of a room. The room includes a generally L-shaped desk 101 that is illustrated in light gray shading and extends along the length of one wall and partially along another wall. The room also includes a linear cabinet 102 illustrated in light gray shading, and a floor area 103 illustrated in white. The floor area 103 is the greatest distance away from the ceiling, the desk 101 is the second greatest distance away from the ceiling, and the cabinet 102 is the shortest distance away from the ceiling. A LED-based lighting network having distance sensors, such as LED-based lighting network 100, may be installed on the ceiling of the room of FIG. 2A. One or more distance values based on one or more readings of the distance sensors 114 may be sent to the controller 150 to ascertain the layout of the room of FIG. 2A. For example, distance values from the distance sensors 114 may be geographically arranged to ascertain a room layout, such as illustrated in the low resolution depth map 105 of FIG. 2B. The one or more distance values transmitted by the distance sensors 114 may include data that is directly indicative of a measured distance and/or data that is indirectly indicative of a measured distance and may be analyzed by the controller 150 to determine the measured distance.

Figure 2B:
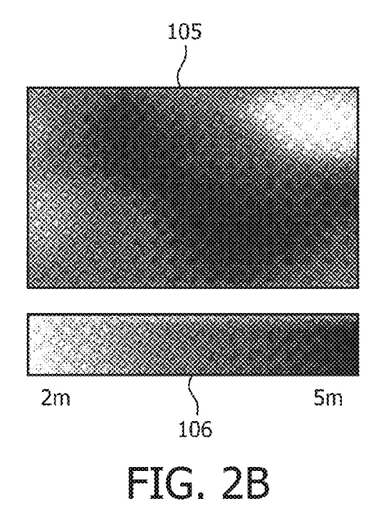
FIG. 2B illustrates a depth map of the room layout of FIG. 2A.

The depth map 105 and associated scale 106 present an overview of the layout of the room of FIG. 2A. The scale 106 has a low value of 2 meters represented by substantially white shading, a high value of 5 meters represented by substantially black shading, and various intermediary values represented by various levels of gray-scale shading. Review of the depth map 105 and scale 106 illustrate that the area around the cabinet 102 has the shortest distance values, the area around the floor 103 has the longest distance values, and the area around the desk 101 has distance values that are in between values from the floor 103 and the values from the cabinet 102. The depth map 105 of FIG. 2B may be generated based on knowing the locations of the distance sensors 114 relative to one another and obtaining the distance values at each of the distance sensors 114. The resolution of the depth map may be increased by increasing the number of distance sensors 114 or decreased by decreasing the number of distance sensors 114. A depth map 105 is illustrated in FIG. 2B for ease in explanation of an embodiment of the LED-based lighting network 100 and may optionally be created by controller 150 in some embodiments. However, one of ordinary skill in the art, having had the benefit of the present disclosure, will recognize and appreciate that in alternative embodiments values from distance sensors 114 may be collected and analyzed for utilization in setting the light output characteristics of one or more LEDs 112 without creation of an actual depth map. For example, in some embodiments distance values from distance sensors may be stored in memory associated with the controller. The distance values may be directly or indirectly correlated with LEDs (e.g., based on the location of the LEDs relative to the distance sensors) to set the light output characteristics of the LEDs.

The controller 150 may utilize the distance values from distance sensors to set the light output characteristics of each of the LEDs 112. For example, the controller 150 may direct LEDs 112 that are above the shortest distance values corresponding with the cabinets 102 (e.g., as determined by direct or indirect association with one or more distance sensors 114) to provide a relatively low light output intensity on the cabinets 102. Also, for example, the controller 150 may direct LEDs 112 that are above the midrange distance values corresponding with the desk 101 to provide a relatively high light output intensity on the desk 101 to correspond with desired workplace lighting. Also, for example, the controller 150 may direct LEDs 112 that are above the largest distance values corresponding with the floor 103 to provide a light output intensity on the floor 103 that is between the relatively high and relatively low light output intensities. Also, for example, the controller 150 may set the light output color of one or more of the LEDs 112 based on the distance values (e.g. warmer light may be desirable on top of the cabinets 102).

As described herein, one or more light output characteristics of each of the LEDs 112 may be set as a function of the detected distance value proximal that LED and the desired light level on the surface corresponding to the detected distance value. The light output characteristics of one or more of the LEDs 112 may also optionally be based on readings from one or more ambient light sensors located adjacent one or more of the distance sensors 114 or elsewhere (e.g., for measuring the overall light level that includes light coming from windows or other sources). The setting of the light output of the LEDs 112 may be done during commissioning of the LED-based lighting network 100, when the layout of a monitored space is changed, and/or in real time. In a real time configuration the setting of the light output of the LEDs 112 may be changed in response to the movement of furniture, other objects (e.g., mannequins) and/or people in a monitored space.

In some embodiments, the controller 150 may be a centralized controller that processes values from all of the distance sensors 114 in an area and directs the light output of all of the LEDs 112 in the area. However, in other embodiments a decentralized approach with local processing (e.g., a plurality of controllers, each controlling a single LED or a cluster of LEDs) may be desirable. In the decentralized approach, readings from a single distance sensor may be processed by a local controller and utilized to set outputs of a nearby LED or cluster of LEDs. For example, if a change in the distance values of a single distance sensor is detected, the nearby LED or cluster of LEDs can be set by the local controller in a certain way, optionally while maintaining direct and/or indirect communication with other local controllers (e.g., with geographically neighboring controllers). For example, in some embodiments if a change in distance values is detected, the local controller for that sensor may alter light output of the associated LED(s) independently of LEDs associated with other distance sensors. Each local controller may operate at least partially independent of other LEDs outside of the LED or cluster of LEDs. In some embodiments the decentralized approach may be implemented in a configuration such as the LED-based lighting network 100 (e.g., each distance sensor 114 may be paired with a controller and that controller may control one or more of the LEDs 112 surrounding the distance sensor 114). In some other embodiment the decentralized approach may be implemented when the ratio of distance sensors to LEDs is relatively high (e.g., approximately a 2:1 ratio or approximately a 1:1 ratio). In some embodiments the detection area of each distance sensor will substantially coincide in area with the light output area of each LED cluster associated with the distance sensor. In some versions of those embodiments the detection area of each distance sensor will substantially coincide in location with the light output area of each LED cluster associated with the distance sensor.

One or more controllers (centralized and/or decentralized) may compare the measured distance values from distance sensors with one another to generate the layout of the monitored space. For example, distance values from all distance sensors may be compared in some embodiments. Also, for example, in some embodiments distance values from a grouping of distance sensors may be compared among the grouping. Through comparison of a plurality of distance values from a plurality of sensors, various features of the monitored space may be ascertained. For example, the height of the room can be derived from the distribution of large distance values. Also, for example, the location of possible workplaces can be derived from the distribution of medium distance values. Also, for example, the location of bookcases and/or cabinets can be derived from the distribution of small distance values.

Figure 3:
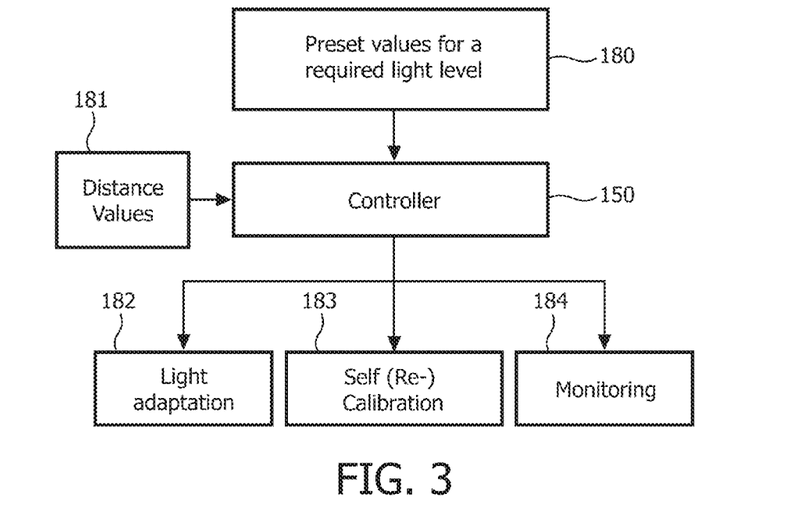
FIG. 3 illustrates a schematic of an embodiment of setting a light output characteristic of a LED as a function of at least one measured distance value.

FIG. 3 illustrates a schematic of an embodiment of setting a light output of a LED as a function of at least one measured distance value. Preset illumination values for a required light level 180 are provided to the controller 150. The preset illumination values for a required light level 180 may be the illumination values that are desired on a surface for illumination. For example, floors may have a first illumination value, work surfaces may have a second illumination value, high location surfaces may have a third illumination value, and/or areas in front of walls or in front of high locations may have a fourth illumination value. Distance values 181 from distance sensors 114 are also provided to the controller 150.

Based on the distance values 181 and the preset illumination values 180, the controller 150 may direct light adaptation 182 at the LEDs 112 to set light output values at each of the LEDs 112 to achieve the preset illumination values at the surfaces below the LEDs 112. For example, it may be desired for floors to have a first illumination value. Based on the received distance values 181 it can be determined how far the floor is from the LEDs 112 that have light output directed at the floor. Based on the desired first illumination value and the distance between the LEDs 112 and the floor, the controller 150 may direct light adaptation 182 of the appropriate LEDs 112 to substantially achieve the first illumination value on the floor. The LEDs 112 may optionally self-calibrate 183 to ensure desired light output is being generated. For example, the LEDs 112 may each be paired with an optical sensor that measures generated light output and the light output of the LEDs 112 may be adjusted to conform measured light output with desired light output. In some embodiments the optical sensor may measure generated light output from a plurality of LEDs 112. In some versions of those embodiments the LEDs 112 may generate unique coded light that identifies the source of the light and the optical sensor and/or controller 150 may detect such coded light and thereby determine which LEDs 112 are contributing to the measured light level at the optical sensor.

Monitoring 184 may occur after the initial light adaptation 182 and self-calibration 183 and the light output characteristics of one or more of the LEDs 112 adjusted upon change of one or more monitored values. For example, in some embodiments input from at least one ambient light sensor 116 is also supplied to the controller 150 in determining the necessary light output values from LEDs 112 to achieve the preset illumination values for a required light level 180 at a surface (e.g., less light output intensity would be needed from LEDs 112 with increasing ambient light). Such ambient light values may be monitored and the light output of LEDs appropriately adjusted in response to ambient light values that change by at least a threshold amount. Also, for example, the distance sensors 114 may be monitored and light output of one or more LEDs 112 adjusted in response to measured distance values that change by at least a threshold amount (e.g., in response to moving objects and/or people).

In some embodiments, the distribution of measured distance values for one or more distance sensors 114 may be tracked and light output values of LEDs 112 associated with such distance sensors 114 optionally modified based on such distribution. By tracking the distribution of measured distance values for a given distance sensor 114 over time, it can be determined whether the given distance sensor 114 is directed at a high use area and/or pathway where objects and/or people are regularly moving and light output adapted accordingly. For example, it may be desirable for greater light output intensity in pathways where objects and/or people are regularly moving. Also, for example, it may be desirable for greater light output intensity in workplace areas with high levels of human activity. Also, for example, it may be desirable for lower light output intensity in areas with low levels of human activity.

Figure 4A:
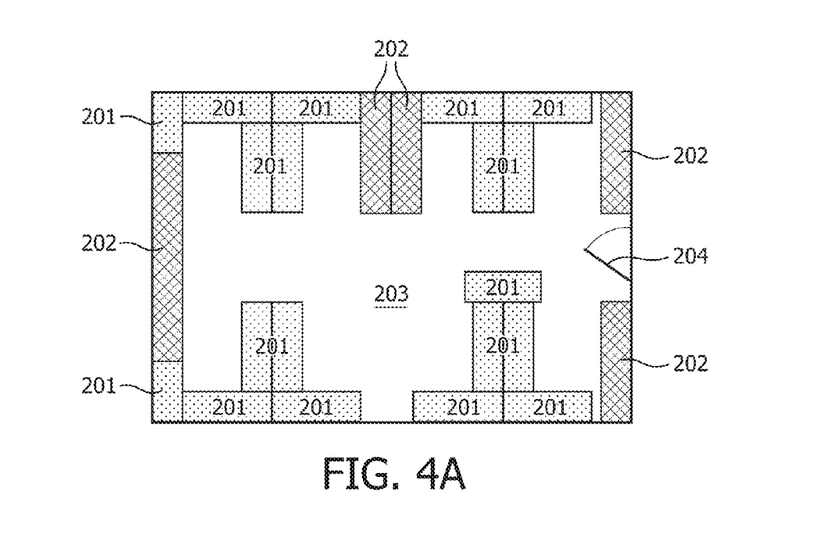
FIG. 4A illustrates a top plan view of a layout of another room.

FIG. 4A illustrates a top plan view of a layout of another room. The room includes eight separate generally L-shaped desks 201 that are illustrated in a first shading. The room also includes five cabinets 202 interspersed throughout the room and illustrated with a second shading. A floor area 203 is also illustrated with a third shading and a door 204 into the room is graphically depicted. The floor area 203 is the greatest distance away from the ceiling and the cabinets 202 are the shortest distance away from the ceiling. The desks 201 are at one or more distances between the cabinets 202 and the floor area 203. A LED-based lighting network having distance sensors, such as LED-based lighting network 100, may be installed in the room of FIG. 4A. Values from a plurality of distance sensors may be sent to one or more controllers (localized or decentralized) to ascertain the layout of the room of FIG. 4A.

Figure 4B:
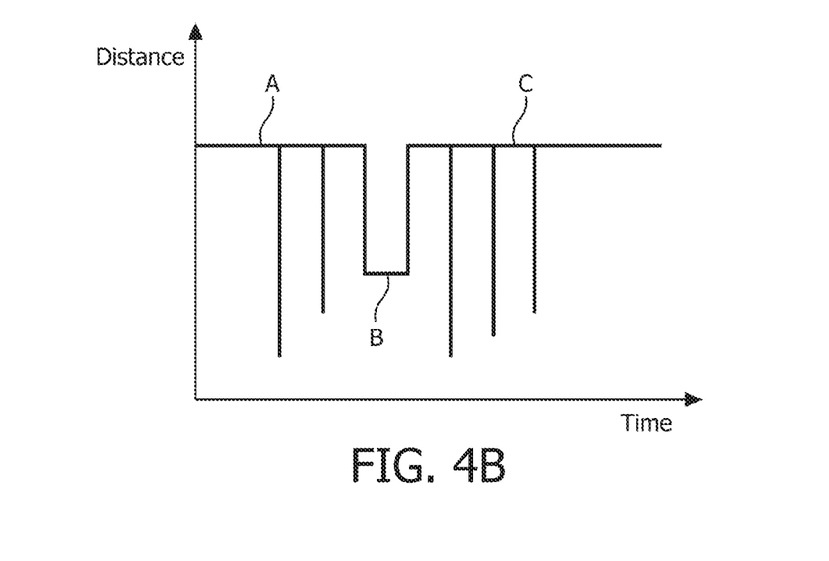
FIG. 4B illustrates values from one distance sensor in the room of FIG. 4A over a period of time.

The one or more controllers may also utilize values from the distance sensors to determine where pathways and/or areas of high human activity are within the room. For example, FIG. 4B illustrates values from one distance sensor in the room of FIG. 4A over a period of time. The distance sensor of FIG. 4B may be positioned over and directed at part of the pathway from the door 204 to one or more of the desks 201. The values from the distance sensor indicate a plurality of values A that correspond to the distance between the ceiling and the floor for a period of time; followed by a brief distance value B that is of a shorter distance and that corresponds to the distance between the ceiling and a human walking under the ceiling; that is then followed by values C that correspond to the distance between the ceiling and the floor for a period of time. values such as those illustrated in FIG. 4B may indicate that a human or other object has passed by the sensor for a short time period. A sufficient number of values throughout the day such as those illustrated in FIG. 4B may indicate to the controller that the distance sensor of FIG. 4B is above a pathway. Accordingly, the controller may cause one or more LEDs associated with the distance sensor of FIG. 4B (e.g., those immediately adjacent to and/or paired with the distance sensor) to illuminate the portion of the floor 203 at which they are directed at an intensity that is higher than it would be if it were a non-pathway section of the floor 203.

The one or more controllers may also utilize values from the distance sensors to determine where areas of high human activity are within the room. For example, a distance sensor that is located over the floor 203 that is immediately adjacent a utilized portion of one desk 201 may experience a plurality of readings that correspond to the distance between the ceiling and the floor for a period of time (e.g., times when no worker is present) and a plurality of readings of extended time periods that are of a shorter distance and that corresponds to the distance between the ceiling and a human under the ceiling (e.g., times when a worker is present). A sufficient number of readings throughout the day such as those may indicate to the controller that such distance sensor is above an area of high human activity. Accordingly, the controller may cause one or more LEDs associated with the distance sensor (e.g., those immediately adjacent to and/or paired with the distance sensor) to illuminate the portion of the floor 203 at which they are directed at an intensity that is higher than it would be if it were a non-high human activity section of the floor 203.

Figure 4C:
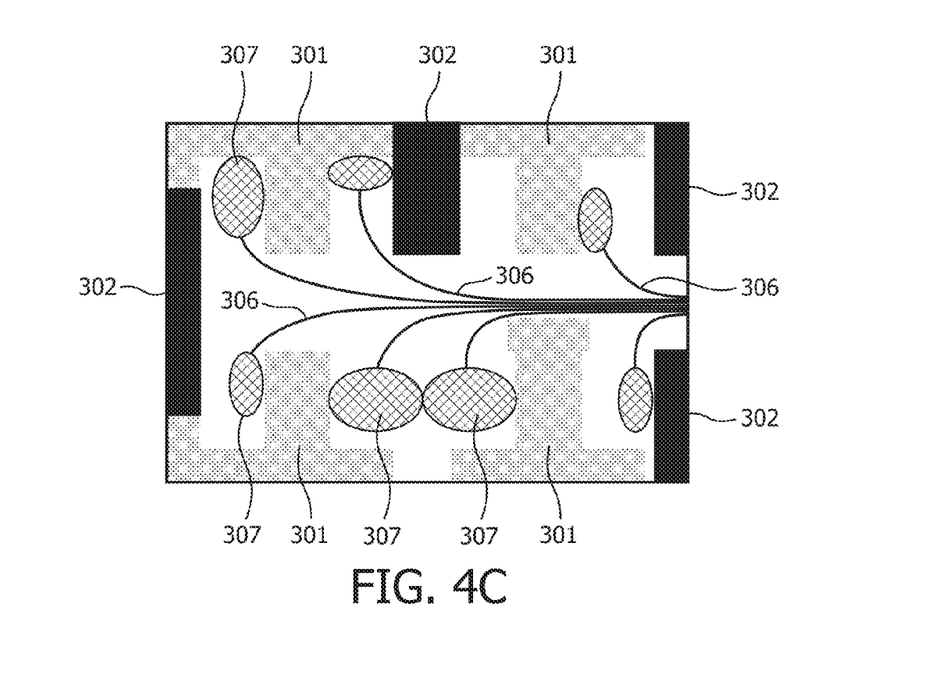
FIG. 4C illustrates a generated map of the room of FIG. 4A based on values from a plurality of distance sensors in the room of FIG. 4A.

FIG. 4C illustrates a generated map of the room of FIG. 4A based on values from a plurality of distance sensors in the room of FIG. 4A. The map of FIG. 4A may be based on a high resolution of distance sensors within the room of FIG. 4A. Based on analysis of values from the distance sensors (e.g., sustained maximum values from the sensors) tall surface areas 302 corresponding to the cabinets 202 may be ascertained, mid-range surface areas 301 corresponding to the desks 201 may be ascertained, and short surface areas 303 corresponding to the floor 203 may be ascertained. Moreover, based on analysis of a plurality of values from the distance sensors over time, pathways 306 may be ascertained (e.g., based on a sufficient quantity of brief periods of decreased distance values from the sensors) and areas of high human activity 307 may be ascertained (e.g., based on a sufficient quantity of extended periods of decreased distance values from the sensors). As illustrated in FIG. 4C, seven separate areas of high human activity 307 are present and pathways 306 are present between each area of high human activity 307 and the door 204.

A map is illustrated in FIG. 4C for ease in explanation of an embodiment of the LED-based lighting network and may optionally be created by a controller in some embodiments. A user may optionally view and/or edit such a map via a user interface in some embodiments. However, one of ordinary skill in the art, having had the benefit of the present disclosure, will recognize and appreciate that in alternative embodiments values from distance sensors may be collected and analyzed for utilization in setting the light output characteristics of one or more LEDs without creation of an actual map. For example, in some embodiments distance values from distance sensors may be stored in memory associated with the controller. The distance values may be directly or indirectly correlated with LEDs (e.g., based on the location of the LEDs relative to the distance sensor) to set the light output characteristics of the LEDs.

Figure 4D:
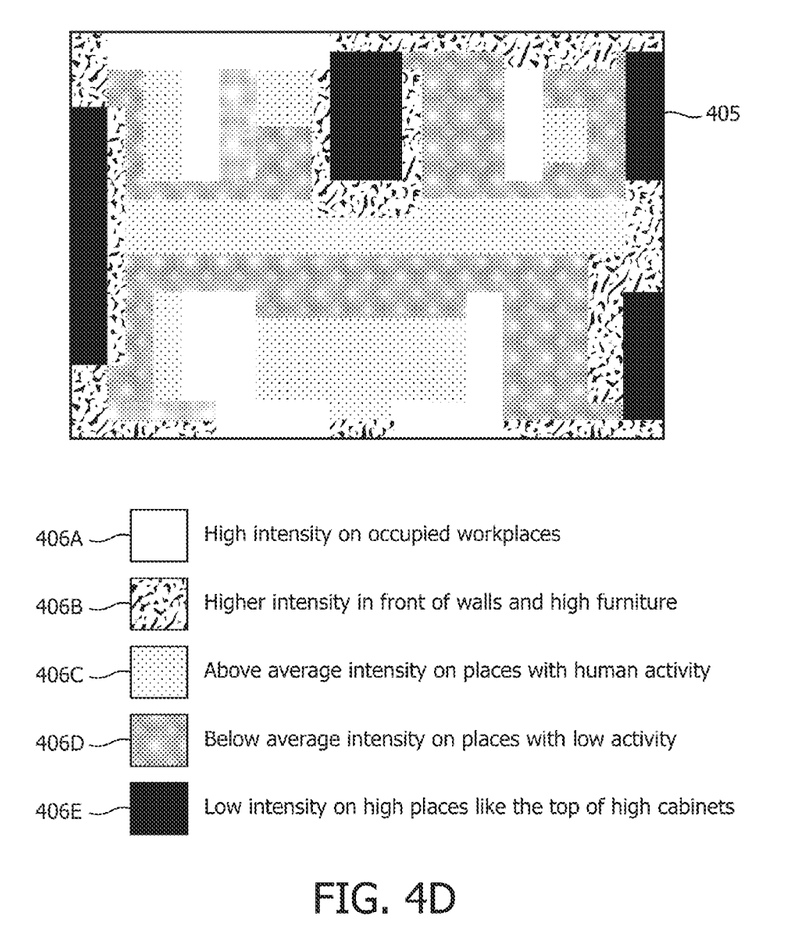
FIG. 4D illustrates a top plan view representation of a target light intensity distribution for the room of FIG. 4A.

FIG. 4D illustrates a top plan view representation 405 of a target light intensity distribution for the room of FIG. 4A. The representation includes five different shadings 406A-E. White shading 406A indicates a high intensity on the occupied workplace surfaces of the room of FIG. 4A (e.g., those surfaces identified as desks 202 that have high human activity 307 very close by). Shading 406B indicates a higher intensity than average on the indicated surfaces, but less than the high intensity of white shading 406A. Shading 406B is provided in front of walls and in front of high furniture (except in certain places such as those where shading 406A is appropriate). Shading 406C indicates an above average intensity on the indicated surfaces, but less than the intensity of shading 406B. Shading 406C is provided on places with high human activity (e.g., the high human activity areas 307 and along the pathways 306). Shading 406D indicates a below average intensity on the indicated surfaces that is less than the intensity of shading 406C. Shading 406D is provided on places with low activity. Shading 406E indicates a low intensity on the indicated surfaces that is less than the intensity of shading 406D. Shading 406E is provided on high places such as the tops of cabinets 202. The light output intensity of the LEDs within the room may be adjusted based on the target light intensity distribution of FIG. 4D. For example, LEDs that are directed at the surfaces marked with white shading 406A may be set to generate a high intensity on those surfaces, optionally taking into account the measured distance(s) of those surfaces from the distance sensors (providing an indication of the distance between the LEDs and those surfaces) and/or the ambient light level in the room (providing an indication of the intensity on the surfaces generated by ambient light alone).

A particular target light intensity distribution is illustrated in FIG. 4D for ease in explanation of an embodiment of the LED-based lighting network. However, one of ordinary skill in the art, having had the benefit of the present disclosure, will recognize and appreciate that in alternative embodiments additional and/or alternative light intensity distribution parameters may be utilized. For example, in some embodiments more or fewer than five separate intensity distributions may be provided (e.g., different intensities may be utilized for areas in front of walls and areas in front of high furniture). Also, for example, additional or alternative light output characteristics (e.g., color, light angle) may additionally be associated with one or more intensity distributions.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

Also, reference numerals appearing in the claims between parentheses, if any, are provided merely for convenience and should not be construed as limiting the claims in any way.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The invention claimed is:

1. A method of calibrating light output of a plurality of LEDs, comprising:
    determining a first distance value at a first distance sensor and determining a second distance value at a second distance sensor;
    correlating said first distance value with at least a first LED of said plurality of LEDs, wherein said plurality of LEDs are effectively arranged in a plane on a ceiling;
    correlating said second distance value with at least a second LED of said plurality of LEDs;
    determining at least one ambient light level proximate to said first LED and said second LED;
    setting a first light output of said first LED as a function of said first distance value and said ambient light level, wherein a height dimension of said first distance value is a predominant dimension upon which said first light output depends; and
    setting a second light output of said second LED as a function of said second distance value and said ambient light level, wherein light characteristics of said first light output at a first distance defined by said first distance value are different from corresponding light characteristics of said second light output at a second distance defined by said second distance value.

2. The method of claim 1, further comprising monitoring said first distance sensor over a period of time for a plurality of substantial deviations from said first distance value to determine whether said first distance sensor is above at least one of a pathway and a high activity area.

3. The method of claim 2, wherein said first light output is set as a function of whether said first distance sensor is above said at least one of said pathway and said high activity area.

4. The method of claim 3, wherein said first light output is of a greater intensity if it is determined said first distance sensor is directed at said at least one of said pathway and said high activity area than it is if it is determined said first distance sensor is not directed at said at least one of said pathway and said high activity area.

5. The method of claim 1, further comprising monitoring said first distance sensor over a period of time for a plurality of substantial deviations from said first distance value and wherein said step of setting said first light output is a function of at least one of frequency of said substantial deviations and distance value of said substantial deviations.

6. The method of claim 1, wherein said first light output is set as a function of the difference between said first distance value and said second distance value.

7. The method of claim 6, wherein said first light output is of a lesser intensity if it is determined said first distance value is significantly less than said second distance value than it is if it is determined said first distance value is significantly greater than said second distance value.

8. The method of claim 7, wherein said first distance value is correlated only with said first LED.

9. A method of calibrating light output of a plurality of LEDs, comprising:
    determining a first distance value at a first distance sensor and determining a second distance value at a second distance sensor;
    correlating said first distance value with at least a first LED of said plurality of LEDs, wherein said plurality of LEDs are effectively arranged in a plane on a ceiling;
    correlating said second distance value with at least a second LED of said plurality of LEDs;
    setting a first light output of said first LED as a function of said first distance value, wherein a height dimension of said first distance value is a predominant dimension upon which said first light output depends; and
    setting a second light output of said second LED as a function of said second distance value, wherein light characteristics of said first light output at a first distance defined by said first distance value are different from corresponding light characteristics of said second light output at a second distance defined by said second distance value.

* * * * *